United States Patent [19]

van der Lely

[11] 4,003,437

[45] Jan. 18, 1977

[54] SOIL CULTIVATING IMPLEMENTS

[76] Inventor: Ary van der Lely, 10, Weverskade, Maasland, Netherlands

[22] Filed: July 13, 1972

[21] Appl. No.: 271,512

Related U.S. Application Data

[62] Division of Ser. No. 56,048, June 24, 1970, abandoned.

[30] Foreign Application Priority Data

Mar. 30, 1967 Netherlands ............. 6704508

[52] U.S. Cl. .................. 172/59; 172/102; 172/111; 172/391; 172/572
[51] Int. Cl.² ........................... A01B 33/02
[58] Field of Search ............. 172/53, 54, 59, 84, 172/91–93, 101, 102, 110, 111, 389–391, 522, 523, 572, 573, 714, 607, 609

[56] References Cited

UNITED STATES PATENTS

| 128,067 | 6/1872 | Reed | 172/607 |
| 327,713 | 10/1885 | Nelson | 172/607 |
| 542,880 | 7/1895 | Faris | 172/607 |
| 837,450 | 12/1906 | Crook | 172/607 X |
| 1,166,135 | 12/1915 | Lamp | 172/59 |
| 1,304,952 | 5/1919 | Enloe | 172/391 |
| 3,422,907 | 1/1964 | Gijzenberg | 172/102 |
| 3,499,494 | 3/1970 | Gijzenberg | 172/53 |

FOREIGN PATENTS OR APPLICATIONS

| 1,564,217 | 3/1969 | France | 172/53 |
| 568,625 | 4/1945 | United Kingdom | 172/417 |
| 1,114,240 | 5/1968 | United Kingdom | 172/53 |

Primary Examiner—Clifford D. Crowder
Assistant Examiner—Paul T. Sewell
Attorney, Agent, or Firm—Mason, Mason & Albright

[57] ABSTRACT

A harrow having two horizontal elongated tined members the ends of which are driven around substantially vertical axes and including a soil contacting elongated element mounted to each of the tined members.

3 Claims, 10 Drawing Figures

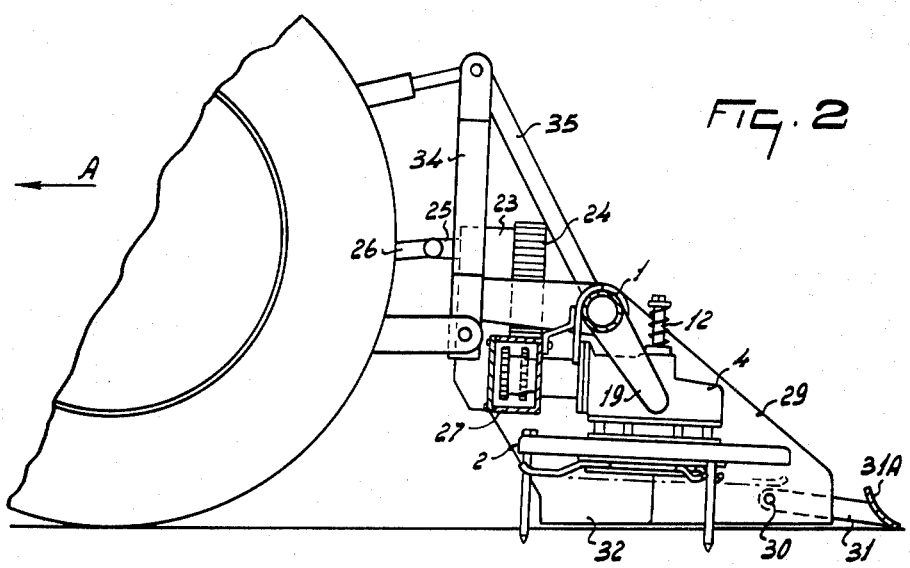
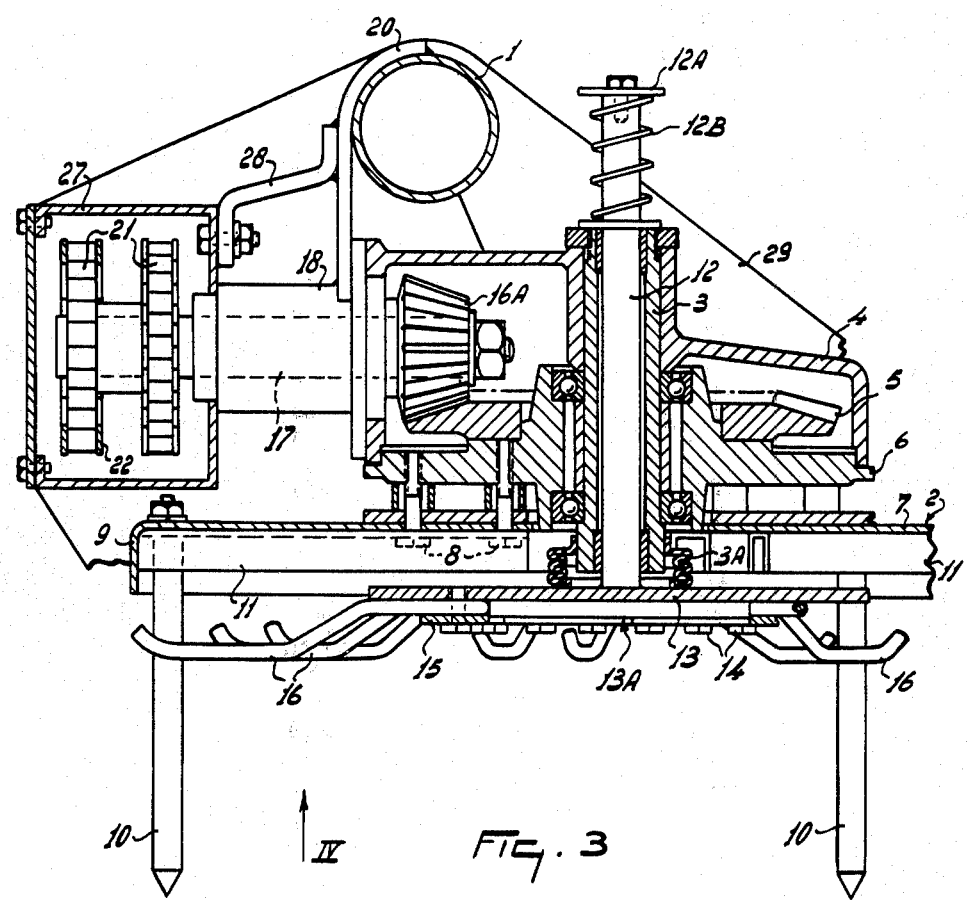

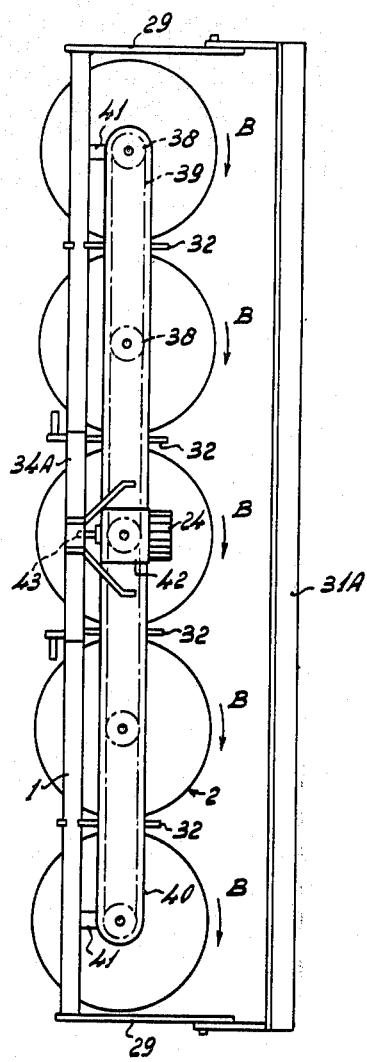
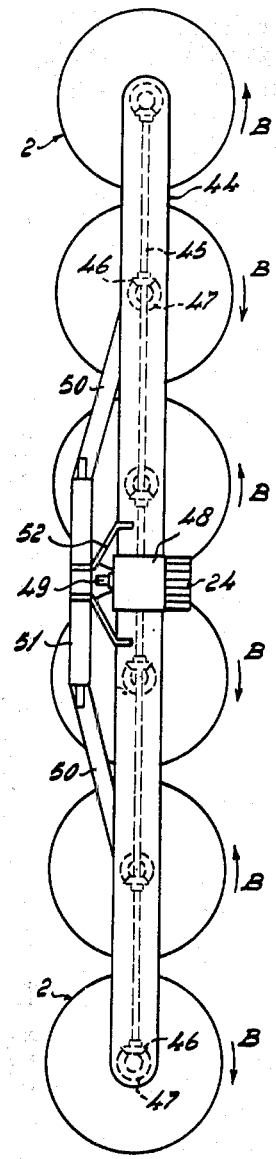

SOIL CULTIVATING IMPLEMENTS

This is a division of application Ser. No. 56,048 filed June 24, 1970 now abandoned.

This invention relates to a harrow of the kind comprising a frame which can be attached to the rear of a tractor or the like and which is movable over the ground and at least two tined members arranged to be driven by the power-take-off shaft of the tractor during use of the harrow.

According to the invention, there is provided a harrow of the kind set forth, wherein at least one tined member is provided with a member that is arranged to move with the said tined member during driving of the latter, the said member extending substantially horizontally and being mounted in such a way, that during operation it contacts the soil.

Figure 1:
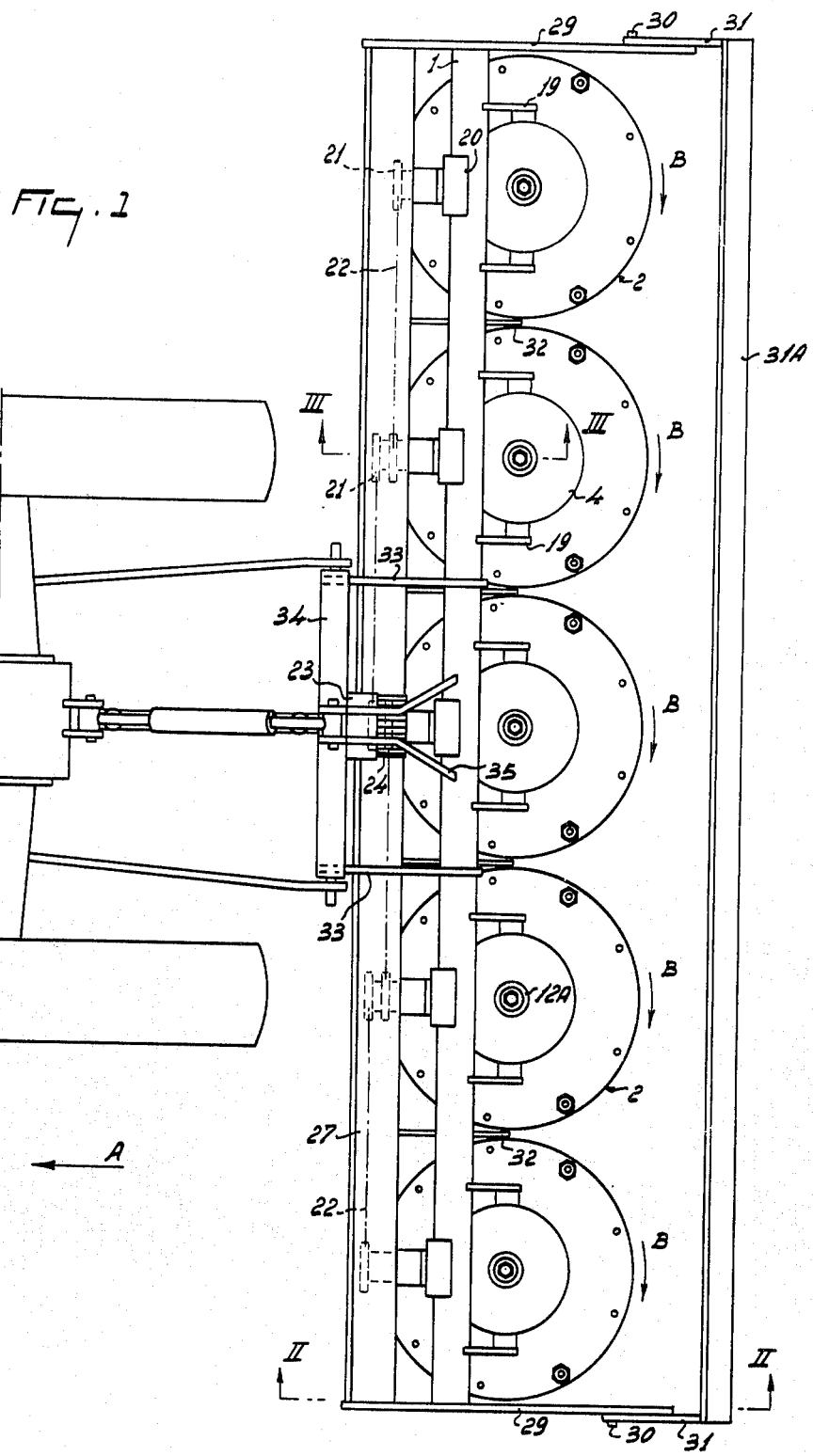
Figure 4:
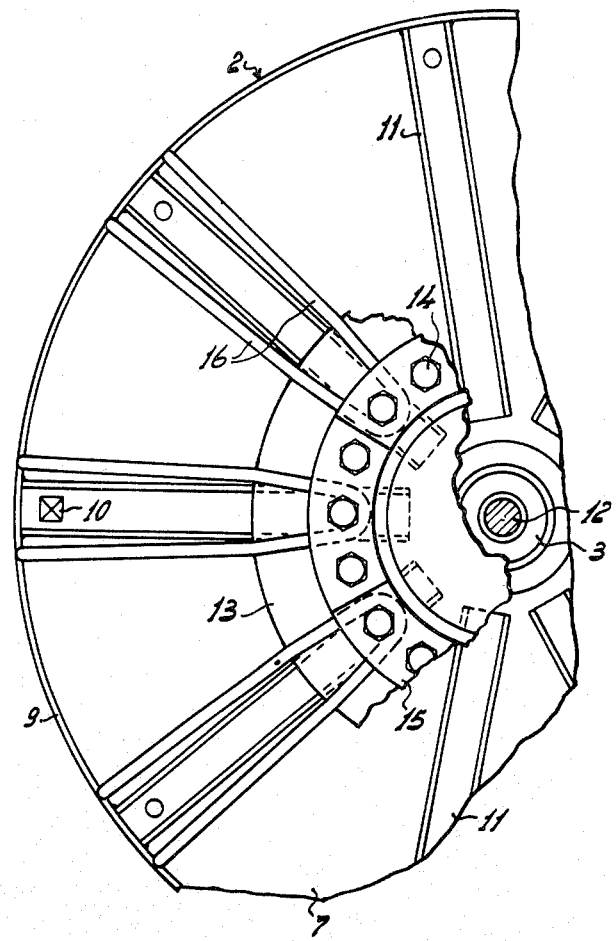
Figure 5:
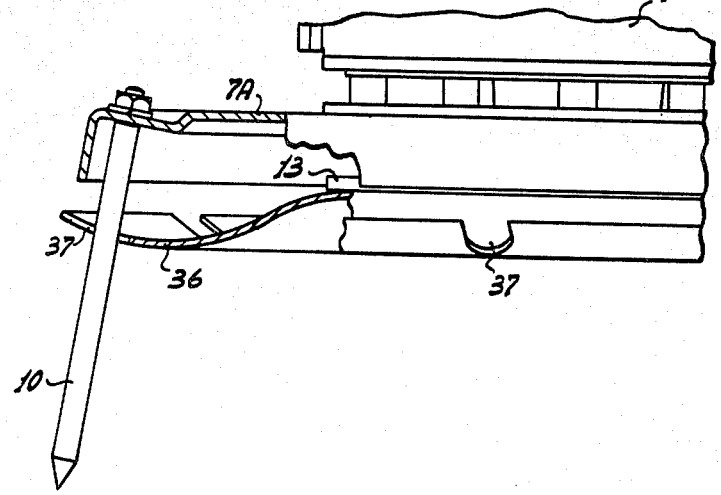
Figure 8:
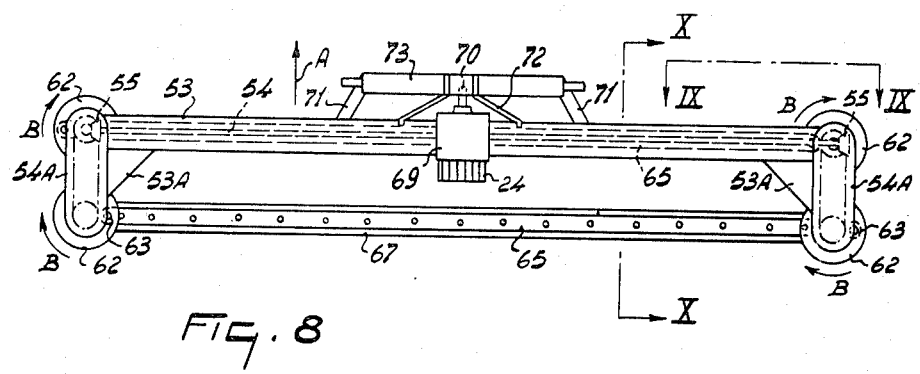
Figure 9:
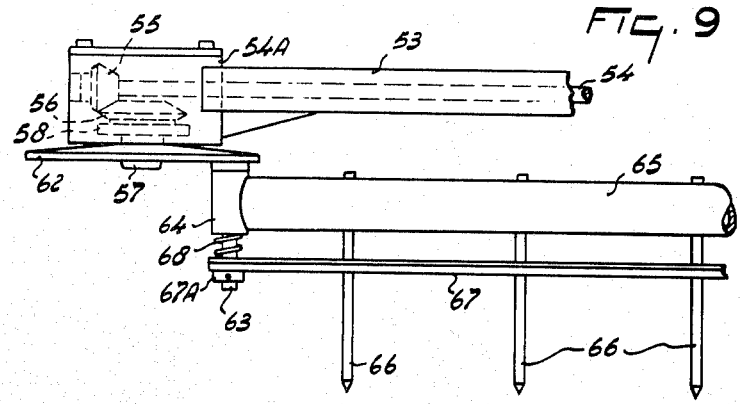
Figure 10:
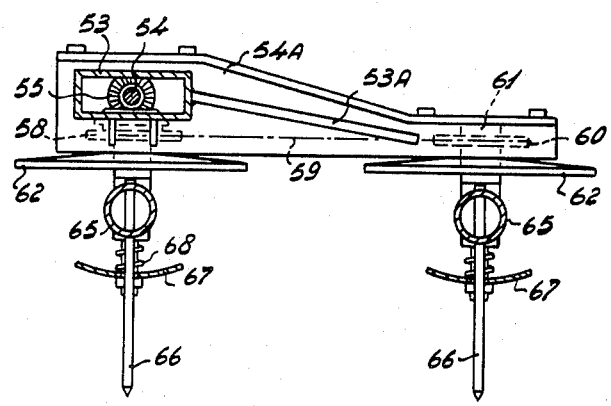

For a better understanding of the invention, and to show how the same may be carried into effect, reference will now be made, by way of example, to the accompanying drawings, in which:

FIG. 1 is a plan view of a harrow in accordance with the invention coupled to the rear of an agricultural tractor, FIG. 2 is a section taken on the line II—II of FIG. 1, FIG. 3 is a section, to an enlarged scale, taken on the line III—III of FIG. 1, FIG. 4 is a scrap view as seen in the direction indicated by the arrow IV of FIG. 3, FIG. 5 is a part-sectional elevation showing an alternative form of tined member which may be used with the cultivator of FIGS. 1 to 4, FIG. 6 is a diagrammatic view corresponding to FIG. 1, but to a reduced scale, illustrating an alternative form of a harrow, FIG. 7 corresponds to FIG. 6 but shows a further alternative form of a harrow in accordance with the invention, FIG. 8 corresponds to FIGS. 6 and 7 and shows a further alternative construction in accordance with the invention, FIG. 9 is a view, to an enlarged scale, as seen in the direction indicated by the arrows IX—IX of FIG. 8, and FIG. 10 is a section, to an enlarged scale, taken on the line X—X of FIG. 8.

Referring to FIGS. 1 to 4 of the drawings, the soil cultivating implement or harrow which is illustrated has a frame which includes a horizontally or substantially horizontally extending main frame beam 1 that is normally disposed perpendicular or substantially perpendicular to the intended direction of operative travel of the cultivator, this direction being indicated by an arrow A in FIGS. 1 and 2 of the drawings. Tined-cultivating members 2 are coupled to the main frame beam 1 at regular intervals along the length thereof, there being five soil-cultivating members in the example which is being described. Each soil-cultivating members in the example which is being described. Each soil-cultivating member 2 is arranged to be rotatable about the vertical or substantially vertical axis of a corresponding hollow shaft 3 most of which is located inside a corresponding gear box 4. A crown wheel or bevel pinion 5 is rotatably arranged around the shaft 3 with the aid of ball bearings and is rigid with a part 6 which part effectively forms the bottom of the corresponding gear box 4. A substantially horizontally disposed disc 7 is mounted at a short distance beneath the part 6 and is connected to that part with the aid of bolts 8 and spacing sleeves which surround the shanks of said bolts. The outermost edge of the disc 7 is bent over perpendicularly downwardly to form a rim 9 and rigid pointed tines 10 are secured to the disc 7 by nuts so as to lie close to the rim 9. Strips 11 of inverted channel-shaped cross-section extend radially of the disc 7 on its lower side up to the rim 9 and the tines 10 project downwardly between the limbs of the strips as can be seen best in FIGS. 3 and 4 of the drawings. It will be noted that the disc 7 is formed with nine holes to receive the upper ends of the tined 10 and that said holes are spaced at 40° intervals around the centre of the disc 7. Only three tines 10, spaced at 120° intervals around the centres of the discs 7, are provided in respect of each soil-cultivating member 2 in the example which is being described.

Each hollow shaft 3 accommodates a corresponding solid guide shaft 12 which is axially displaceable in the shaft 3. A substantially horizontal circular plate 13 is rigidly secured to the lowermost end of the solid shaft 12 and a plurality of resilient rods 16, made from a material such as spring steel, are secured to the lower side of the plate 13. As can be seen best in FIG. 4 of the drawings, the spring steel or other resilient rods 16 are formed in integral hairpin-like pairs the junctions between the limbs of which are secured to the plate 13 with the aid of bolts 14 and arcuate clamping plates 15. It can be seen from FIG. 3 of the drawings that each rod 16 has a portion which is inclined obliquely downwardly from the edge of the plate 13, this portion merging into a substantially horizontal portion of the free and radially outermost end (with respect to the centre of the plate 13) of which is bent over upwardly. In the example which is being described, the number of pairs of rods 16 is equal to the number of strips 11, the two rods 16 of each pair being located at relatively opposite sides of one of the tines 10 or at relatively opposite sides of a location at which one of the tines 10 could be mounted. The plate 13 and the rods 16 together form a grating-like element which is generally indicated by the reference 13A.

A helical compression spring 12B surrounds each of the solid shafts 12 between an upper stop-washer 12A and the uppermost end of the corresponding hollow shaft 3. A flexible concertina or banjo sleeve 3A, formed from rubber, synthetic rubber or a synthetic plastic material, extends between a lower region of the hollow shaft 3 and a circular rib which projects upwardly from the upper surface of the plate 13. The teeth of the crown wheel or bevel pinion 5 are in driven communication with those of a bevel pinion 16A secured to one end of a rotary shaft 17 that extends substantially horizontally parallel to the direction A. The shaft 17 is received in a horizontal bearing 18 that projects forwardly from the gear box 4.

Each gear box 4 is connected to the main frame beam 1 by a pair of supports 19 and each bearing 18 is connected to the beam 1 by a partially curved plate or strip 20. The leading ends of all the shafts 17 are drivingly interconnected by sprocket wheels 21 and endless transmission chains 22. The shaft 17 corresponding to the central gear box 4 of the five gear boxes is linked by way of a gear box 23 and a change-speed gear 24 to an input shaft 25 whose leading end can be placed in driven communication with the power take-off shaft of a tractor or other vehicle with the aid of an intermediate transmission shaft 26 having universal joints at its opposite ends. The change-speed gear 24 is constructed so as to be capable of giving at least two different transmission ratios between its input and output sides but it is not considered necessary to give full details of its construction here. If such details are required, they may be found in the Specification of British Patent Application No. 44585/65. The chains 22 and sprocket wheels 21 are contained within a casing 27 which is fastened to the plates or strips 20 by bolts that co-operate with lugs 28 projecting from said plates or strips.

The ends of the main frame beam 1 and chain casing 27 are interconnected by two vertical plates 29 that extend parallel to the direction A, said plates having parts which lie rearwardly of the main frame beam 1 relative to said direction. Two arms 31 are connected to the rearward portions of the plates 29 so as to be turnable relative to those portions about a substantially horizontal axis afforded by horizontally aligned pivot pins 30. A smoothing strip 31A with a bent front side whose shape can be seen in FIGS. 1 and 2 of the drawings perpendicularly interconnects the free and rearmost ends of the two arms 31. Four vertical plates 32 extend parallel to the direction A and lie between succeeding soil-cultivating members 2, said plates 32 extending rearwardly from the main frame beam 1 up to a substantially vertical plane which contains the axes of rotation of all of the members 2. Plates 33 project forwardly from the main frame beam 1 at opposite sides of the central one of the five soil cultivating members 2, the leading ends of said plates 33 being connected to a coupling member 34 that is constructed and arranged, in a manner which is known per se, for connection to the upper and lower lifting links of the three-point lifting device or hitch of an agricultural tractor or other vehicle in the manner shown in outline in FIGS. 1 and 2 of the drawings. Two strips 35 interconnect the main frame beam 1 and an upper region of the coupling member 34, lower portions of said strips 35 diverging relative to one another towards the main frame beam 1.

FIG. 5 shows an alternative construction of the tined soil cultivating members 2 in which a disc 7A replaces the disc 7 and has a radially outermost region shaped in such a way that the tines 10 which are connected thereto are all contained in a substantially conical surface whose apex is substantially coincident with the corresponding axis of rotation. The grating-like element 13A is replaced by a plate-shaped element 36 a central region of which is fastened to the plate 13 whilst the region thereof that surrounds said central region is curved downwardly towards the outermost edge of the element which edge is curved in the reverse direction so as to project obliquely upwards. Nine slots 37 are formed in the outermost edge region of the element 36 and it will be evident from FIG. 5 of the drawings that each slot is intended to have a corresponding one of the rigid tines 10 entered therethrough.

In the use of the cultivating implement or harrow which has been described, the coupling member 34 is connected to the three-point lifting device or hitch of an agricultural tractor or other vehicle and the input shaft 25 is placed in driven connection with the power take-off shaft of the same tractor or other vehicle with the aid of the transmission shaft 26. Upon moving the harrow over the ground in the direction A, the soil cultivating members 2 are all caused to rotate in the same direction which is indicated by arrows B in FIG. 1 of the drawings. The tips of all the tines 10 trace neighbouring approximately horizontal paths through the surface of the soil which is thus broken up and crumbled to a considerable extent. The use of more, or less, tines 10 per member 2 will clearly augment or decrease the crumbling effect as will an increase or decrease in the speed of rotation of the members 2. This latter is achieved by appropriate adjustment of the change-speed gear 24, which, is is preferred, should be capable of enabling the members 2 to be rotated at speeds of 100 or 175 revolutions per minute in response to an approximately constant speed of rotation of the shaft 25. It is preferred that other speeds of rotation greater, lower and between those that have just been mentioned should be attainable by using the change-speed gear 24.

The grating-like element 13A extending substantially horizontally which can be considered to be of plate-shaped formation and the side of which facing the soil in flat rotates with each member 2 and can move vertically as required to match undulations in the surface of the soil. The upward inclinations of the free ends of the rods 16 prevent the element 13A from penetrating into the soil to any appreciable extent and said element, which bears upon the surface of the soil under its own weight against the action of the spring 12B, acts to level and spread out the soil crumbled by the tines 10. The grating-like arrangement of the rods 16 considerably enhances the crumbling effect but, when the construction illustrated in FIG. 5 is employed, the tines 10 act upon the surface of the soil over a wider area and the element 36 has a greater levelling, and less crumbling, action. The plates 29 and 32 have portions which are in the path of any soil thrown up by the tines 10 so that they act to prevent the members 2 from displacing soil laterally of the direction A to an unwanted extent. The strip 31A to the rear of the members 2 extends throughout the width of the strip of land worked by the harrow and smooths and levels the surface of the worked soil to produce a good seed bed.

FIG. 6 of the drawings illustrates a construction in which a chain and sprocket wheel transmission directly interconnects the hollow shafts 3. In this construction, each hollow shaft 3 carries one or two sprocket wheels 38 and said sprocket wheels are appropriately connected to one another by endless chains 39. A chain casing 40 encloses the sprocket wheels 38 and chains 39 and is fastened to the rear of the main frame beam 1 by supports 41. The hollow shaft 3 of the central one of the five tined soil cultivating members 2 is connected to a horizontaly extending rotary input shaft 43 by way of a gear box 42 and the change-speed gear 24, the shaft 43 extending parallel to the intended direction of operative travel of the harrow and being arranged for connection to the power take-off shaft of a tractor or other vehicle by the previously mentioned transmission shaft 26. A coupling member 34A serving the same purpose as the previously mentioned coupling member 34 is, in this case, directly mounted upon the main frame beam 1 and it will be noted that the vertical plates 32 serve the additional function of assisting in supporting the chain casing 40 from beneath.

FIG. 7 of the drawings illustrates a cultivating implement or harrow having a hollow main frame beam 44 that extends substantially horizontally perpendicular to the intended direction of operative travel of the cultivator. A rotary shaft 45 extends longitudinally of the interior of the beam 44 and has six bevel pinions 46 secured to it at intervals therealong. Each pinion 46 cooperates drivingly with a corresponding bevel pinion 47 mounted at the upper end of a hollow shaft 3 associated with a corresponding tined soil-cultivating member 2. It will be seen from FIG. 7 of the drawings that the arrangement of the bevel pinions 46 is such that, during use of the harrow, the six soil-cultivating members 2 rotate in opposite directions B, each member 2 rotating in a direction which is opposite to that of its neighbour, or both its neighbours. The six members 2 may be considered as forming three neighbouring pairs in which the two members 2 of each pair rotate in opposite directions. A central region of the shaft 45 is arranged to be driven from a rotary input shaft 49 by way of a gear box 48 and the change-speed gear 24. The details of this transmission are not shown in FIG. 7. A coupling member 51 similar to the previously mentioned coupling members 34 and 34A has a lower part connected to the beam 44 by forwarding converging strips 50 and an upper part also connected to said beam by upwardly converging strips 52.

The tined soil cultivating members 2 shown in FIGS. 6 and 7 of the drawings and the elements 13 or 13A that cooperate therewith operate in a similar manner to that which has been described with reference to FIGS. 1 to 5 of the drawings but, in the embodiment of FIG. 7, there are no vertical plates 32 between the neighbouring members 2 and there is no smoothing strip 31A to the rear of the members 2. However, it will be understood that the plates 32 and/or smoothing strips 31A may be provided in the harrow of FIG. 7 if so desired.

FIGS. 8 to 10 of the drawings show a cultivating implement or harrow which includes a hollow main frame beam 53 of oblong cross-section. The beam 53 extends substantially horizonatally perpendicular to the intended direction of operative travel of the harrow and has rearwardly-projecting box-shaped portions 54A connected to its opposite ends in such a way that said portions extend longitudinally rearwardly from the beam, the connections between the beam 53 and the box-shaped portions 54A being reinforced by generally triangular strengthening plates 53A. The interior of the hollow beam 53 is in communication with the interiors of the box-shaped portions 54A and the beam 53 has a longitudinally extending shaft 54 rotatably housed within its interior, the opposite ends of said shaft lying inside the portions 54A and being provided with bevel pinions 55. The teeth of the pinions 55 are in mesh with those of further bevel pinions 56 mounted on substantially vertical rotary shafts 57 disposed internally of the portions 54A to a major extent. Sprocket wheels 58 are also secured to the shafts 57 beneath the pinions 56 and these sprocket wheels are in driving connections with further sprocket wheels 60 disposed at the rear ends of the portions 54A by way of endless transmission chains 59. The sprocket wheels 60 are mounted on substantially vertical shafts 61 that are rotatably journalled in the rear ends of the portions 54A.

The lowermost ends of the four shafts 57 and 61 project beneath the portions 54A and have the centres of circular discs 62 rigidly secured to them. Each disc 62 has a substantially vertical stub shaft 63 secured to it adjacent its edge so as to extend downwardly therefrom. Each stub shaft 63 is surrounded by a vertical sleeve bearing 64 and the sleeve bearings 64 are fastened in two pairs to the opposite ends of tined members 65 that extend parallel to the main frame beam 53. Each tined member 65 carries a row of regularly spaced and downwardly projecting rigid tines 66. Two curved plate-shaped members or soil contacting elements 67 are provided that extend longitudinally parallel to the tined members 65 beneath the latter. Holes in the opposite ends of the members 67 have lower portions of the stub shafts 63 entered therethrough, helical compression springs 68 being arranged around said stub shafts between the upper surfaces of the members 67 and the lowermost ends of the sleeve bearings 64. Stop-rings 67A are releasably secured to the lowermost extremities of the stub shafts 63 and the lowermost surfaces of end regions of the members 67 normally bear thereagainst. The cross-sectional shape of each member 67 can be seen best in FIG. 10 of the drawings and it will be noted therefrom that the convex sides of the members which members extend substantially horizontally face downwardly.

A central region of the shaft 54 is placed in driven connection, in a manner not shown in the drawings, with the input shaft 70 of a gear box 69 by way of the aforementioned change-speed gear 24. The input shaft 70 projects forwardly of the harrow in the intended direction of travel thereof and can be placed in driven connection with the power take-off shaft of an agricultural tractor or other vehicle by way of an intermediate transmission shaft having universal joints at its opposite ends. A coupling member 73 similar to those that have already been described is connected to the front of the main frame beam 53 by way of forwardly converging strips 71 and upwardly converging strips 72.

In the use of the harrow which has been described with reference to FIGS. 8 to 10 of the drawings, its coupling member 73 is connected to the three-point lifting device or hitch of an agricultural tractor or other vehicle and the input shaft 70 is placed in driven connection with the power take-off shaft of the same vehicle. Upon moving the harrow over the ground in the direction A, the opposite ends of the tined soil-cultivating members 65 are caused to orbit around the axes of the shafts 57 and 61 in the directions indicated by the arrows B in FIG. 8. The arrangement is such that the supports 65 remain substantially parallel to the beam 53 throughout their movements but, as can be seen in FIG. 8 of the drawings, the arrangement is also such that said supports 65 move alternately towards and away from one another. However, this is not essential and the transmission may be re-arranged so that the two supports 65 maintain a substantially constant distance apart from one another. The tips of the tines 66 trace substantially horizontal paths through the soil surface, each tine 66 being entered through a hole in the corresponding plate-shaped member 67 and the two members 67 being movable upwardly, against the opposition of the springs 68, along the tines 66. The lowermost surface of each member 67 performs a levelling or smoothing action upon the soil crumbled by the tines 66 so as to produce a seed bed of the required consistency. All of the harrows which have been described bear upon the ground surface, during their use, only by way of the tined soil-cultivating members. However, it will be appreciated that the various plate-shaped members also bear against the soil surface to a limited extent during operation and that the smoothing strip 31A, when provided, bears upon the soil surface under its own weight.

What we claim is:
1. A harrow having a frame with coupling means for attachment to a prime mover, and at least one movable tined member mounted on said frame to the rear of said coupling means with respect to the direction of travel of the harrow, said tined member being movable in horizontal directions about substantially vertical axes, driving means supported on said frame and connected adjacent at least one end of said tined member to move same and crumble soil during operation, said tined member comprising a substantially horizontal elongated support, which extends approximately perpendicular to the direction of travel of the harrow and tine means being secured to said support, a soil contacting elongated element being interconnected to said tined member and mounted for horizontal movement with said tined member, said element extending substantially parallel to and being located beneath said support, said elongated element being provided with at least one inclined edge and including spring means biasing said soil contacting element towards the ground.

2. A harrow having a frame with coupling means for attachment to a prime mover, and at least one movable tined member mounted on said frame to the rear of said coupling means with respect to the direction of travel of the harrow, said tined member being movable in horizontal directions about substantially vertical axes, driving means supported on said frame and connected adjacent at least one end of said tined member to move same and crumble soil during operation, said tined member comprising a substantially horizontal elongated support, which extends approximately perpendicular to the direction of travel of the harrow and tine means being secured to said support, a soil contacting elongated element being interconnected to said tined member and mounted for horizontal movement with said tined member, said element extending substantially parallel to and being located beneath said support, said element being provided with at least one inclined edge, each end of said support being mounted on a vertical shaft and rotatable about substantially vertical axes, each shaft being eccentrically mounted on a rotary disc and each disc being rotated by said driving means.

3. A harrow having a frame with coupling means for attachement to a prime mover, and at least one movable tined member mounted on said frame to the rear of said coupling means with respect to the direction of travel of the harrow, said tined member being movable in horizontal directions about substantially vertical axes, driving means supported on said frame and connected adjacent at least one end of said tined member to move same and crumble soil during operation, said tined member comprising a substantially horizontal elongated support, which extends approximately perpendicular to the direction of travel of the harrow and tine means being secured to said support, a soil contacting elongated element being interconnected to said tined member and mounted for horizontal movement with said tined member, said element extending substantially parallel to and being located beneath said support, said elongated element being provided with at least one inclined edge, tines being mounted along the length of the support, said tines extending downwardly through said soil contacting element, a compression spring being mounted on said tined member between said support and said soil contacting element.

* * * * *